United States Patent [19]

Durand et al.

[11] Patent Number: 4,865,256
[45] Date of Patent: Sep. 12, 1989

[54] TURBOJET ENGINE HAVING A THRUST REVERSER DOOR AND VARIABLE EXHAUST CROSS-SECTION

[75] Inventors: Lionel F. G. J. Durand, Fontaine la Mallet; Xavier R. Y. Loré, Le Havre, both of France

[73] Assignee: Societe anonyme dite Hispano-Suiza, Saint-Cloud, France

[21] Appl. No.: 265,816

[22] Filed: Nov. 1, 1988

[30] Foreign Application Priority Data

Nov. 5, 1987 [FR] France .............................. 87 15337

[51] Int. Cl.$^4$ .............................................. B64C 15/06
[52] U.S. Cl. ........................... 239/265.29; 239/265.37; 244/12.5
[58] Field of Search ................ 244/124, 12.5; 60/230, 60/232; 239/265.19, 265.1, 265.25, 265.27, 265.29, 265.35

[56] References Cited

U.S. PATENT DOCUMENTS

| 2,813,395 | 11/1957 | Meyer | 239 X/265.19 X |
| 2,947,499 | 8/1960 | Douglas | 239/265.29 X |
| 3,434,666 | 3/1969 | Shaw | 239/265.19 |
| 3,570,247 | 3/1971 | Dennign et al. | 239/265.19 X |
| 3,598,318 | 8/1971 | Schiel | 239/265.29 X |
| 3,612,400 | 10/1971 | Johnson | 239/265.19 |
| 3,973,731 | 8/1974 | Thayer | 239/265.29 X |
| 4,093,122 | 6/1978 | Lindermann et al. | 239/127.3 |
| 4,194,692 | 3/1980 | Dickenson | 239/265.39 |
| 4,641,782 | 2/1987 | Woodward | 239/265.29 |

FOREIGN PATENT DOCUMENTS 1302154 7/1962 France .
0067747 12/1982 France .

Primary Examiner—Andres Kashnikow
Assistant Examiner—Kevin P. Weldon
Attorney, Agent, or Firm—Bacon & Thomas

[57] ABSTRACT

A thrust reversing system acting on a cold flow air duct of a turbofan-type turbojet engine is disclosed wherein the thrust reversing doors conform to a turbojet engine housing formed as a body revolution about a central longitudinal axis. The thrust reversing doors function to selectively divert the air passing through the cold flow air duct into a reverse thrust direction and also serve to vary the cross-section of the air duct. When the thrust reversing doors are in the forward thrust position, the downstream edges of the doors may be adjusted in a radial direction to vary the cross-section of the duct. The thrust reversing door is pivotable about a pair of axes, which may extend generally transverse to the longitudinal axis of the engine. The door is pivotally attached to a pair of link arms by a primary pivot which defines the first pivot axis. The link arms are attached to a fixed portion of a turbojet engine structure by a secondary pivot which define the second pivot axis. Individual actuators are provided for moving the door about the first pivot axis and for moving the link arms about the second pivot axis.

19 Claims, 4 Drawing Sheets

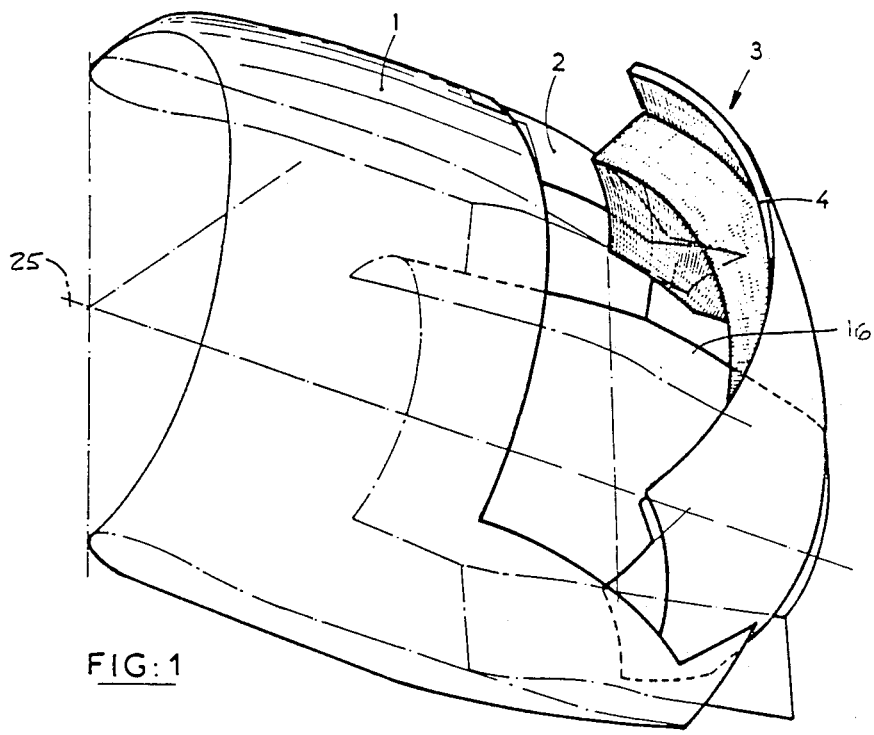
FIG:1
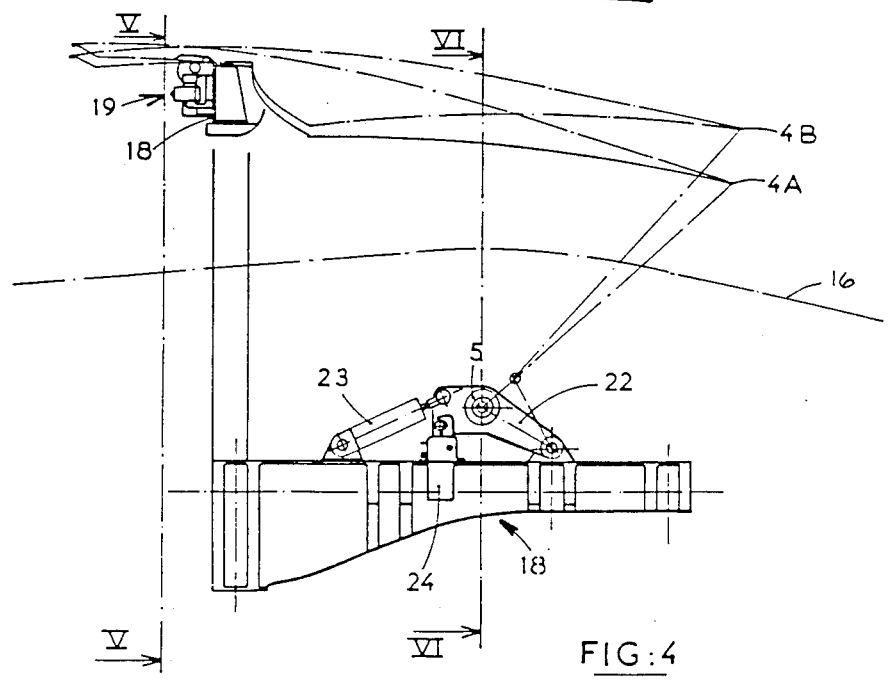
FIG:4

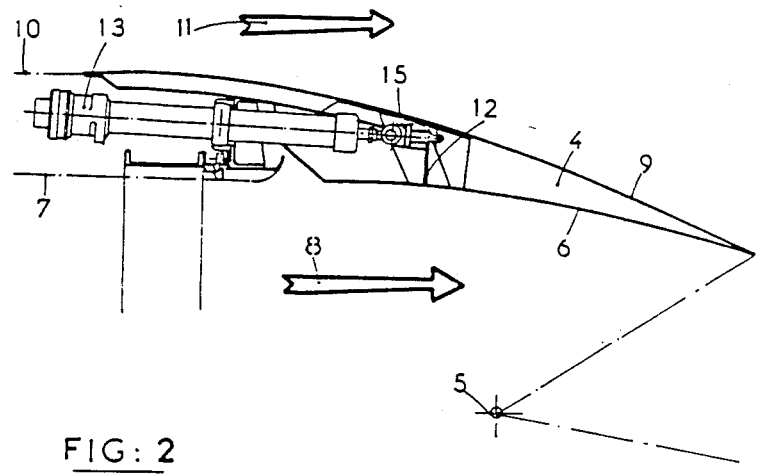
FIG: 2
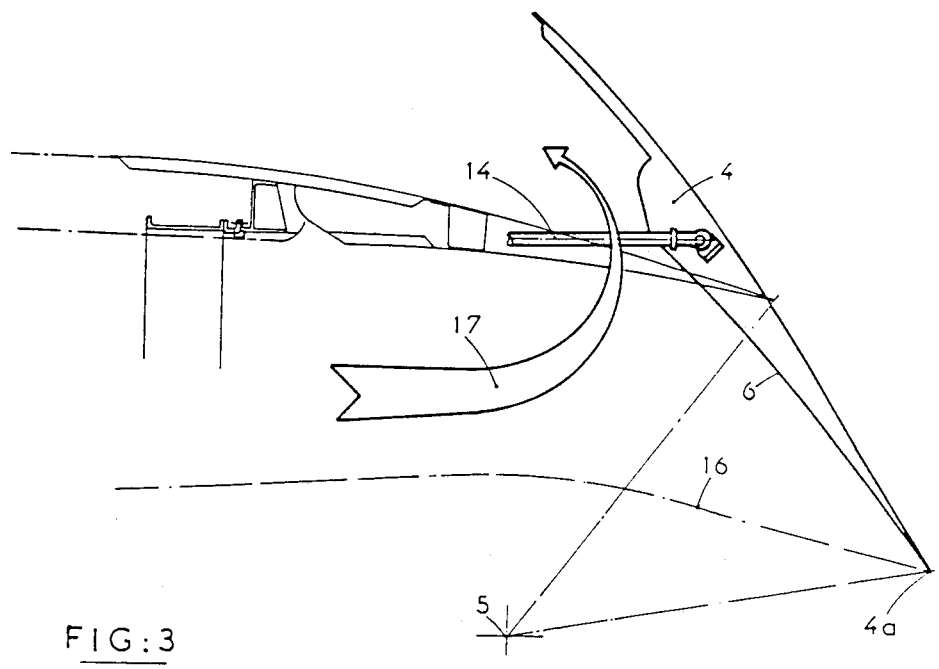
FIG: 3

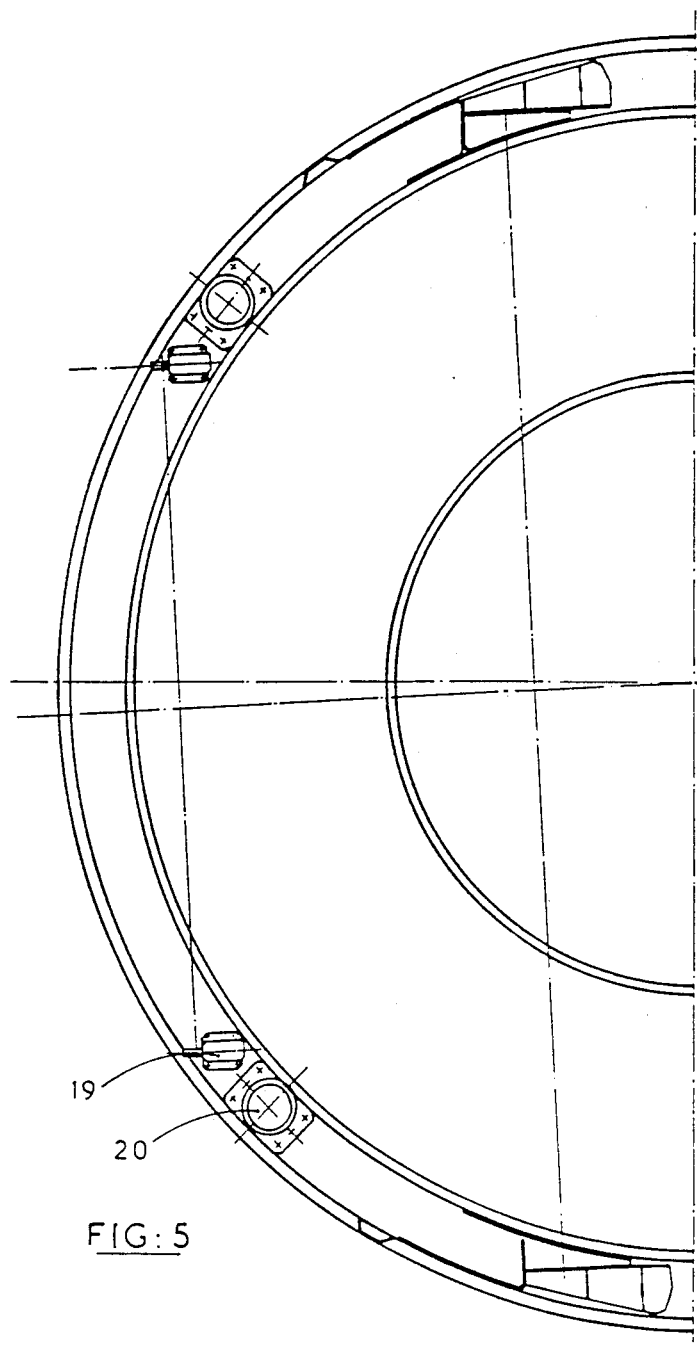
FIG: 5

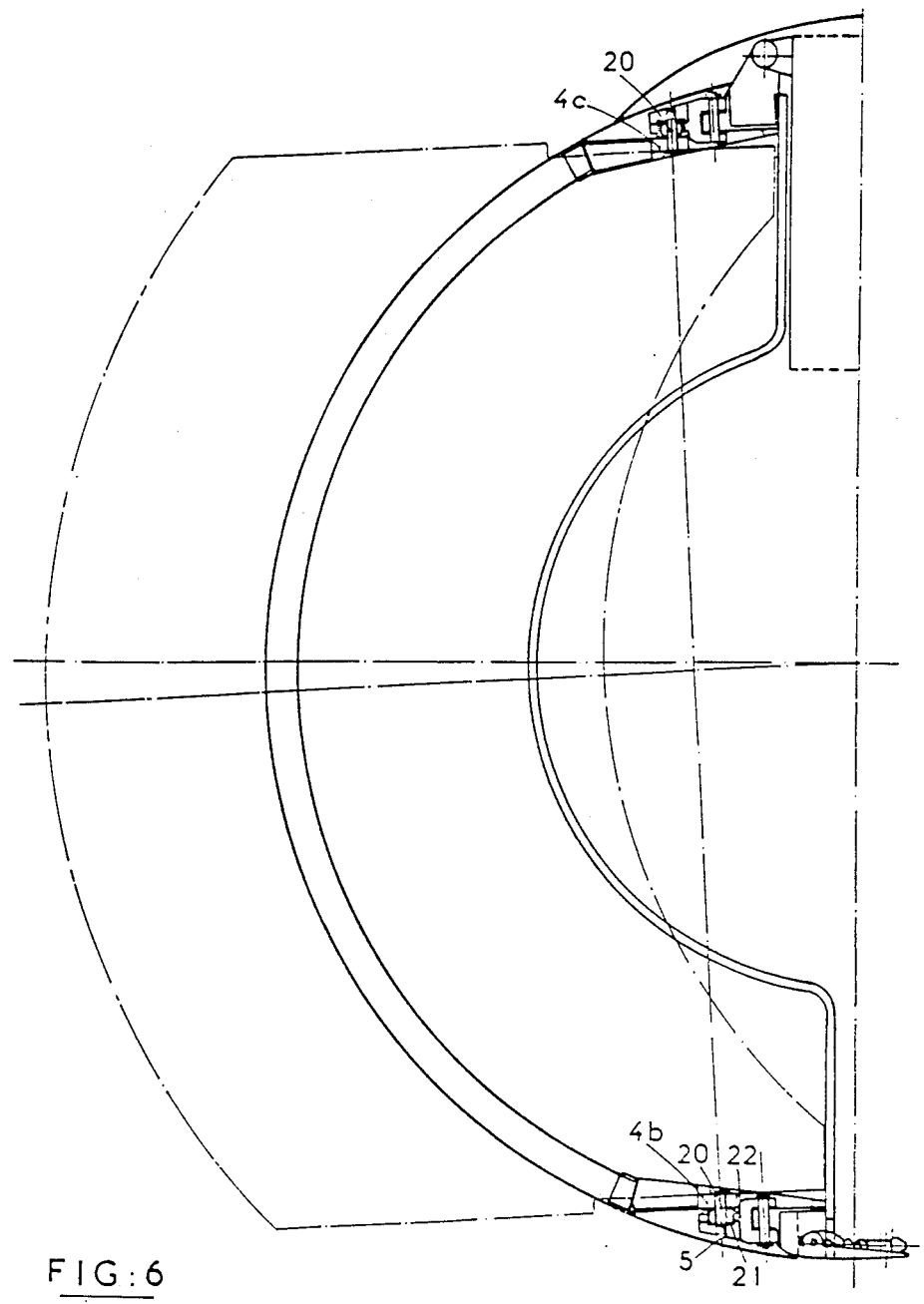
FIG:6

TURBOJET ENGINE HAVING A THRUST REVERSER DOOR AND VARIABLE EXHAUST CROSS-SECTION

BACKGROUND OF THE INVENTION

The present invention relates to a thrust reversing system for a turbofan-type turbojet engine, more particularly, such a thrust reverser wherein the thrust reversing doors also serve to vary the cross-section of the cold flow air duct.

Turbojet engine thrust reversing systems are well known and typically comprise one or more doors pivotally attached to the turbojet engine housing so as to selectively direct air passing through either a cold flow duct or a hot gas exhaust nozzle in a direction such that a reverse thrust is exerted on the engine components.

It is also known to provide jet engine exhaust ducts with flaps to vary the cross-section of the duct. French Pat. No. 1,302,154 describes a turbojet engine exhaust duct having pivoting flaps that control the cross-sectional configuration of the duct by pivoting about an upstream axis and serving as thrust reversing doors by pivoting about a downstream axis. While this system has been generally satisfactory, it remains restricted to exhaust ducts having a generally rectangular or polygonal cross-sectional configuration.

SUMMARY OF THE INVENTION

The present invention describes a thrust reversing system acting on a cold flow air duct of a turbofan-type turbojet engine wherein the thrust reversing doors conform to the shape of the turbojet engine housing formed as a body of revolution about a central longitudinal axis. The thrust reversing doors function to selectively divert the air passing through the cold flow air duct into a reverse thrust direction and also serve to vary the cross-section of the air duct in order to optimize the engine efficiency. When the thrust reversing doors are in the forward thrust positions, the downstream edges of the doors may be adjusted in a radial direction to decrease or increase the cross-section of the duct, such as during steady-state cruising or take-off.

Each of the thrust reversing doors is pivotable about a pair of axes, which may extend generally transverse to the longitudinal axis of the engine. The door is pivotally attached to a pair of link arms by a primary pivot which defines the first pivot axis. The link arms are attached to a fixed portion of a turbojet engine structure by a secondary pivot which defines the second pivot axis. Individual actuators are provided for moving the door about the first pivot axis and for moving the link arms about the second pivot axis.

When the door functions as a thrust reverser, the link arms are locked in a fixed position thereby holding the first pivot axis stationary and the first actuator pivots the door about the first pivot axis between a forward thrust position and thrust reversing position. In the thrust reversing position, as is well known in the art, a downstream portion of the door blocks off the cold flow air duct so as to divert the air through a generally laterally facing opening in the engine housing. The position of the door serves to direct the air in a direction having a forward component so as to provide the requisite reverse thrust.

When the door is in its forward thrust position, wherein it is substantially flush with the generally circular housing of the engine and covers the laterally facing opening, its upstream edge portion is locked onto a fixed portion of the turbojet engine structure. In order to vary the cross-section of the air duct, the locks on the link arms are released and the secondary actuator pivots the link arms about the second pivot axis. This serves to radially adjust the position of the downstream edge portion of the door in order to vary the cross-section of the air duct. The downstream edge may be moved radially outwardly during take-off to increase the duct area and may be reduced during steady-state engine operation to maximize the efficiency of the engine.

BRIEF DESCRIPTION OF THE DRAWINGS

FIG. 1 is a partial, perspective schematic view of a turbofan engine incorporating the thrust reverser according to the invention.

FIG. 2 is a partial, longitudinal sectional schematic diagram showing the thrust reversing door according to the invention in the forward thrust position.

FIG. 3 is a partial, longitudinal cross-sectional schematic diagram similar to FIG. 2 showing the thrust reversing door according to the invention in the thrust reversing position.

FIG. 4 is a partial, longitudinal cross-section schematic view showing the thrust reversing door according to the invention varying the cross-section of the cold flow air duct.

FIG. 5 is a partial, transverse sectional view taken along line V—V in FIG. 4.

FIG. 6 is a partial, transverse cross-sectional view taken along line VI—VI in FIG. 4.

DETAILED DESCRIPTION OF THE PREFERRED EMBODIMENT

The thrust reverser according to the invention comprises at least one thrust reversing door movable into a variety of positions as illustrated in FIGS. 1-4. The door 4 is attached to a housing wall 1 of the turbofan-type turbojet engine that defines the outer boundary of a generally annular shaped cold flow air duct. As illustrated in FIG. 1, the housing wall 1 has a curved cross-sectional shape and forms a body of revolution about longitudinal axis 25. The interior boundary of the generally annular shaped cold flow air duct is defined by the hot exhaust gas duct 16, illustrated schematically in the figures. In known fashion, the annular cold flow air duct defined by the housing wall 1 and the hot gas duct 16 communicates with a turbofan (not shown) usually located at the front portion of the turbofan-type turbojet engine. The turbofan is driven by the engine and directs air through the cold flow air duct to augment the thrust of the hot exhaust gases, passing through exhaust gas duct.

Stationary structure 2 of the housing 1 defines a generally laterally facing opening through which the air passing through the cold flow air duct is directed when the door 4 is in the thrust reversing mode.

The thrust reversing system 3 comprises a thrust reversing door 4 having a generally curved cross-sectional shape conforming to that of the housing wall 1 such that, when the door 4 is in the forward thrust position, the outer surface of the door lies substantially flush with that of the housing wall 1 to minimize any air disturbance passing over this outer surface. Although only one such thrust reversing door 4 is illustrated in the figures, it should be understood that two or more such doors may be utilized without exceeding the scope of this invention. The operation of the plurality of doors will be the same as that described in reference to the single door illustrated.

Each lateral curved edge of the thrust reversing door 4 is attached to a link arm 22 by pivot means 5. The pivot means 5 defines a primary pivot axis, which may extend generally transverse to the longitudinal axis 25, about which the door 4 may pivot.

Each door 4 defines an inner surface 6 which extends generally flush with inner surface 7 formed on the housing wall 1 so as to provide a substantially continuous aerodynamic surface for the bypass air flow, indicated generally by arrow 8.

Similarly, the door 4 also defines an outer surface 9 that is substantially flush with outer surface 10 of housing wall 1 when the door 4 is in the forward thrust mode so as to present a substantially continuous aerodynamic surface for the air flow 11 passing over the outer surface of the engine. References to upstream and downstream portions of the structure refer to the direction of air flow indicated by arrows 8 and 11 shown in FIG. 2. The upstream direction is toward the left, while the downstream direction is toward the right as illustrated in this figure.

Inner structure 12, which serves to interconnect the inner surface 6 and the outer surface 9 of the thrust reversing door 4, also may serve as an attachment point for the primary actuator 13. Primary actuator 13 may comprise a jack cylinder, attached to a stationary portion of the housing wall 1 and having an extendable and retractable rod 14 attached to the thrust reversing door at 15. Extension and retraction of rod 14 with respect to the jack cylinder 13 will cause thrust reversing door 4 to pivot about axis 5 as illustrated in FIGS. 2 and 3. Extension of rod 14 will cause the downstream edge portion 4a of the thrust reverser door 4 to contact the primary exhaust duct 16 and open the generally laterally facing opening in the housing wall 1. This causes the air passing through the cold flow air duct to travel in the direction of arrow 17 illustrated in FIG. 3 to provide the thrust reversing effect.

Locking means 19 is provided on stationary structure 18, which may be part of the turbojet engine structure, to releasably lock an upstream portion of thrust reversing door 4 to the housing wall 1. Locking means 19 is released before primary actuator 13 is activated, thereby enabling the upstream portion of the door 4 to move radially outwardly into the thrust reversing position shown in FIG. 3.

FIGS. 4 and 6 illustrate the details of the primary pivot 5 attaching the thrust reversing door 4 to the link arms 22. A spindle 20 is rigidly joined to lateral edges 4b and 4c of the thrust reversing door 4. The spindles 20 are pivotally retained in swivel joint 21 which, in turn, is supported on link arms 22. The opposite ends of link arms 22 are pivotally attached to the fixed structure 18 so as to be pivotable about the secondary pivot axis.

A secondary actuator 23, which may also be a jack cylinder having an extendable and retractable rod, is attached to the fixed structure 18, while the end of the rod is attached to link arms 22. Lock means 24 are also mounted on the stationary structure 18 so as to releasably lock the link arms 22 in position as shown in FIG. 4. When it is desired to operate the thrust reversing door between the forward thrust mode and the thrust reversing mode, lock means 24 are secured to the link arms 22 so as to retain them in their stationary positions. Lock means 19 is released thereby enabling the actuation of jack cylinder 13 to move the door 4 between the positions shown in FIGS. 2 and 3.

If it is desired to utilize the door to vary the cross-section of the cold flow air duct, lock means 19 is actuated to secure the upstream portion of the door 4 while lock means 24 is released. The actuation of secondary actuator 23 by extending or retracting the rod will cause link arms 22 to pivot about the secondary pivot axis, thereby moving the downstream edge of the door 4 between the positions 4A and 4B, illustrated in FIG. 4.

The foregoing is provided for illustrative purposes only and should not be construed as in any way limiting this invention, the scope of which is defined solely by the appended claims.

What is claimed is:

1. A thrust reverser for a turbofan type turbojet engine having an exhaust duct for exhausting hot engine gases comprising:
   (a) a housing formed as a body of revolution about a longitudinal axis located about the exhaust duct so as to define a generally annular cold flow air duct therebetween, the housing defining at least one generally laterally extending thrust reversing opening;
   (b) a thrust reversing door having upstream and downstream edge portions;
   (c) a plurality of link arms;
   (d) first pivot means attaching the thrust reversing door to the link arms such that the door may pivot about a first pivot axis;
   (e) second pivot means attaching the link arms to a stationary portion of the turbojet engine such that the link arms may pivot about a second pivot axis;
   (f) primary actuating means operatively connected to the thrust reversing door so as to move the door about the first pivot axis between a forward thrust position in which the door covers the thrust reversing opening, and a thrust reversing position in which the door uncovers the thrust reversing opening and substantially blocks the cold flow air duct to direct air outwardly through the thrust reversing opening; and,
   (g) secondary actuating means operatively connected to at least one of the link arms to pivot the link arms about the second pivot axis thereby radially displacing the downstream edge portion of the thrust reversing door when in the forward thrust position to vary the cross-section of the cold flow air duct.

2. The thrust reverser according to claim 1 further comprising first lock means to releasably lock the upstream edge portion of the thrust reversing door to a stationary portion of the turbojet engine when the door is in its forward thrust position.

3. The thrust reverser according to claim 2 further comprising second lock means to releasably lock at least one link arm to a stationary portion of the turbojet engine.

4. The thrust reverser according to claim 1 wherein the first pivot axis extends generally perpendicular to a longitudinal axis of the cold flow air duct.

5. The thrust reverser according to claim 4 wherein the second pivot axis extends generally parallel to the first pivot axis.

6. The thrust reverser according to claim 5 wherein the first pivot axis is displaced in an upstream direction from the second pivot axis.

7. The thrust reverser according to claim 6 further comprising first lock means to releasably lock the upstream edge portion of the thrust reversing door to a stationary portion of the turbojet engine when the door is in its forward thrust position.

8. The thrust reverser according to claim 7 further comprising second lock means to releasably lock at least one link arm to a stationary portion of the turbojet engine.

9. The thrust reverser according to claim 1 wherein the primary actuating means comprises a primary jack cylinder having an extendable and retractable primary rod.

10. The thrust reverser according to claim 9 further comprising:
(a) first attaching means attaching the primary jack cylinder to a stationary portion of the turbojet engine; and,
(b) second attaching means attaching the primary rod to the thrust reversing door.

11. The thrust reversing door according to claim 1 wherein the secondary actuating means comprises a secondary jack cylinder having an extendable and retractable secondary rod.

12. The thrust reversing door according to claim 11 further comprising:
(a) third attaching means attaching the secondary jack cylinder to a stationary portion of the turbojet engine; and
(b) fourth attaching means attaching the secondary rod to a link arm.

13. The thrust reverser according to claim 12 wherein the primary actuating means comprises a primary jack cylinder having an extendable and retractable primary rod.

14. The thrust reverser according to claim 13 further comprising:
(a) first attaching means attaching the primary jack cylinder to a stationary portion of the turbojet engine; and,
(b) second attaching means attaching the primary rod to the thrust reversing door.

15. The thrust reverser according to claim 14 further comprising first lock means to releasably lock the upstream edge portion of the thrust reversing door to a stationary portion of the turbojet engine when the door is in its forward thrust position.

16. The thrust reverser according to claim 15 further comprising second lock means to releasably lock at least one link arm to a stationary portion of the turbojet engine.

17. The thrust reverser according to claim 16 wherein the first pivot axis extends generally perpendicular to a longitudinal axis of the cold flow air duct.

18. The thrust reverser according to claim 17 wherein the second pivot axis extends generally parallel to the first pivot axis.

19. The thrust reverser according to claim 18 wherein the first pivot axis is displaced in an upstream direction from the second pivot axis.

* * * * *